United States Patent [19]

Tanaka et al.

[11] 4,212,916
[45] Jul. 15, 1980

[54] DENSE, FLEXIBLE COMPOSITE SHEET MATERIAL

[75] Inventors: Minoru Tanaka, Gifu; Kenkichi Yagi, Kyoto; Shunji Mizuguchi, Gifu, all of Japan

[73] Assignee: Toray Industries, Inc., Tokyo, Japan

[21] Appl. No.: 4,680

[22] Filed: Jan. 19, 1979

[30] Foreign Application Priority Data

Feb. 13, 1978 [JP] Japan .................................. 53-14047

[51] Int. Cl.² ............................................ B32B 27/40
[52] U.S. Cl. .................................... 428/290; 427/246; 428/423.5; 428/423.7; 528/64
[58] Field of Search ....................... 428/290, 425, 423; 528/64; 427/246

[56] References Cited

U.S. PATENT DOCUMENTS

| | | | |
|---|---|---|---|
| 3,100,721 | 8/1963 | Holden | 427/246 |
| 3,379,683 | 4/1968 | Booth | 528/64 |
| 3,706,613 | 12/1972 | Toki et al. | 156/85 |
| 3,899,292 | 8/1975 | Okazaki et al. | 8/17 |
| 3,899,623 | 8/1975 | Okazaki et al. | 428/290 |

FOREIGN PATENT DOCUMENTS

| | | |
|---|---|---|
| 52-42840 | 4/1977 | Japan. |
| 917450 | 2/1963 | United Kingdom. |
| 1110868 | 4/1968 | United Kingdom. |
| 1171843 | 11/1969 | United Kingdom. |
| 1300268 | 12/1972 | United Kingdom. |

Primary Examiner—Thomas J. Herbert, Jr.
Attorney, Agent, or Firm—Miller & Prestia

[57] ABSTRACT

A composite material comprising a fibrous sheet which is impregnated with a polyurethane elastomer. The polyurethane elastomer comprises the reaction product of (A) a polymeric diol having a molecular weight of about 800–4000;
(B) an organic diisocyanate having the formula (I)

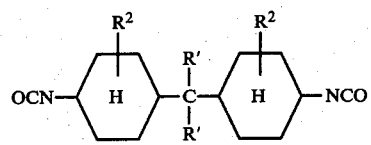

wherein R' and R² are hydrogen or an alkyl group having 1–5 carbon atoms, respectively, and
(C) a chain extender comprising an organic diamine having the formula (II)

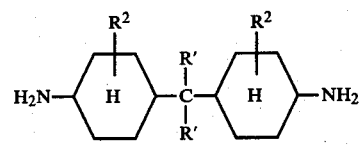

wherein R' and R² are hydrogen or 40–95 mole % alkyl group having 1–5 carbon atoms, respectively, and a phthalic acid dihydrazide having the formula (III)

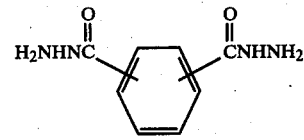

This composite sheet material is useful as a synthetic leather, especially as a suede-like leather sheet material, and has high density, good flexiblity and crease resistance, a supple touch and 60–5 mole % pertinent rubber-like repulsive elasticity.

23 Claims, No Drawings

DENSE, FLEXIBLE COMPOSITE SHEET MATERIAL

DETAILED DESCRIPTION OF THE INVENTION

This invention relates to a novel composite sheet material which is particularly useful as a suede-like sheet material.

In U.S. Pat. No. 3,899,292, we have heretofore disclosed a synthetic suede comprising a fibrous sheet, such as a nonwoven fabric, for example, having superfine denier fibers obtained from so-called islands-in-a-sea fibers, combined with a specific polyurethane elastomer obtained by the reaction of a polymeric diol mixture containing a polyether glycol and a polyester glycol, an organic diisocyanate such as diphenylmethane-4,4'-diisocyanate, and an organic diamine such as p,p'-diaminodiphenylmethane.

It is well known that the synthetic suede obtained by the method described above has earned an excellent reputation in the textile art, and has become a well-known apparel material under the trademark "ULTRASUEDE". This material has excellent qualities, such as fine naps which provide a graceful appearance, a supple touch, ease of handling, availability in a wide variety of colors, good color fastness, light weight, and even quality. It can be manufactured with high yield. "ULTRASUEDE" fabric is somewhat different from natural suede leather and is in some respects superior. On the other hand, it is not always equal to some of the highest qualities of natural suede leather, such as calf suede, in respect of density and elaborateness of structure, and suppleness of hand and touch with suppressed repulsive elasticity.

Various investigations of composite sheet materials, from the point of view of their constituents, i.e. fiber and polyurethane elastomer, and of their interactions, have been made in an endeavor to obtain a synthetic suede having an improved dense and elaborate structure, improved suppleness of hand, improved touch with suppressed repulsive elasticity and preferably shorter naps, all of which are highly important qualities of natural suede of superior excellence. Notwithstanding such efforts, satisfactory synthetic suede meeting the foregoing requirements has not been obtained as yet. By making the structure of the composite sheet dense, short naps were obtainable, but this expedient caused the sheet to become inflexible, rubber-like, difficult to dye and to give many faults such as uneven dyeing and spots, inferior in surface smoothness, partially deformed on wearing, difficult to sew and liable to crease, for example. The unfavorable qualities described above make the sheet undesirable and cause it to lose it good appearance and its good wearing characteristics.

Therefore, attempts to obtain a synthetic suede having all of the foregoing desired properties, which are characteristic of excellent natural suede, have not heretofore met with success.

We have extensively investigated the resolution of these problems and have succeeded in attaining an excellent product as represented by the present invention. Indeed, synthetic suede in accordance with this invention has improved durability, a graceful surface appearance and excellent resistance to abrasion and pilling of naps.

Accordingly, it is an important object of this invention to provide a composite sheet material having a dense and elaborate structure and having good flexibility like that of an excellent natural leather, capable of taking on deep color tones and having unusually delicate hand characteristics.

It is another object of this invention to provide a composite sheet material which has good crease resistance, minimum partial deformation on wearing, good processability in sewing, a surface of excellent smoothness and a graceful "writing effect" when finger marks are applied to the fabric surface.

It is a further object of this invention to provide a composite sheet material which does not discolor in the presence of nitrogen oxide gas, automotive exhaust gases or upon exposure to sunlight.

It is a further object of this invention to provide a napped sheet material having good resistance to abrasion and to surface pilling.

The foregoing and other objects of this invention are accomplished by providing a composite sheet material comprising a fibrous sheet which is impregnated with a polyurethane elastomer comprising the reaction product of (A) a polymeric diol having a molecular weight of about 800–4000;

(B) an organic diisocyanate having the formula (I)

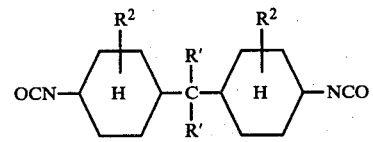

wherein R' and $R^2$ are hydrogen or an alkyl group having 1–5 carbon atoms, respectively, and (C) a chain extender comprising an organic diamine having the formula (II)

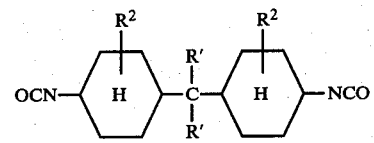

wherein R' and $R^2$ are hydrogen or an alkyl group having 1–5 carbon atoms, respectively, and a phthalic acid dihydrazide having the formula (III)

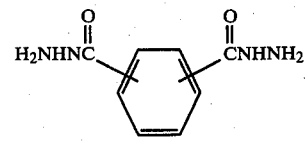

According to the present invention, it is possible to immpart good crease resistance to the composite sheet, to provide sharply reduced partial deformation on wearing (minimizing, for example, protrusions at elbow areas or knee areas), good processability in sewing, and improved surface smoothness which in the case of napped sheet improves the grace of the "writing effect" that is obtained when finger marks are applied.

Also, in accordance with this invention, it is possible to obtain a composite sheet having a dense and elaborate structure and a supple touch remarkably similar to excellent natural leather. Furthermore, it is possible in the practice of this invention to improve remarkably the abrasion and pilling resistance of the napped surface and the durability of the graceful surface appearance. It is also possible to obtain a dyed napped sheet which has a deep color tone and a graceful surface appearance. Further, the product may be produced with high yield in the dyeing process, with few defects such as uneven dyeing or spots, for example. It is also possible to obtain a composite sheet which does not discolor in the presence of nitrogen oxide gas, engine exhaust gases or natural sunlight.

A composite sheet material which has the aforementioned excellent characteristics can be obtained from a specific polyurethane elastomer as previously described, combined with a fibrous sheet made of superfine denier fibers.

Although it is possible to produce a dense, structurally elaborate and flexible composite sheet material by impregnation with a substantially linear polyurethane elastomer obtained by the reaction of a polymeric diol having a molecular weight of more than 800, an organic diisocyanate having the formula (I) and an organic diamine having the formula (II), it has now been discovered that by incorporating a phthalic acid dihydrazide having the formula (III) as one of the components of the chain extending agent, in addition to the organic diamine having the formula (II), the resulting fibrous sheet is not only remarkably more dense and flexible but also is astonishingly more crease resistant.

It has already been proposed in quite different materials to use phthalic acid dihydrazide as a chain extender; such a suggestion appears in British Pat. No. 917,450, and in Japanese Patent Publication No. 39-8099. It has also been separately mentioned in Japanese Patent Publication No. 52-42840 that a polyurethane elastomer may be made up of a specific organic diisocyanate and isophthalic acid dihydrazide.

The objective of the present invention, to make an excellent composite sheet material, has been accomplished for the first time by employing a polyurethane elastomer of this invention obtained from a specific organic diisocyanate having the formula (I), and a specific chain extender consisting essentially of a mixture of an organic diamine having the formula (II) and a phthalic acid dihydrazide having the formula (III) as the impregnant reagent or the coating material for the fibrous sheet. The excellent composite sheet of this invention has not heretofore been obtained by using a polyurethane elastomer made from a single chain extender, either an organic diamine having the formula (II) alone or a phthalic acid dihydrazide having the formula (III) alone.

The polymeric diol of this invention which is a component of the polyurethane elastomer has hydroxy substituents at both ends of the molecule, and has a molecular weight of about 800–4000, preferably about 1000–4000, preferably has a melting point below 70° C., and is selected from the group consisting of polyester glycols, polyether glycols, polyetherester glycols, polyacetal glycols, polybutadiene glycols, mixtures thereof, and others. Representative polymeric diols include polyethylene adipate, polypropylene adipate, polytetramethylene adipate, polyhexamethylene adipate, polycaprolactone glycol, poly(ethyleneoxide) glycol, poly(propyleneoxide) glycol, poly(tetramethyleneoxide) glycol and mixtures thereof. Preferred polymeric diols are polytetramethylene adipate, polycaprolactone glycol and poly(tetramethyleneoxide) glycol. More preferred polymeric diols are mixtures of poly(tetramethyleneoxide) glycol and polytetramethylene adipate or polycaprolactone glycol. The preferred range of the ratio (by weight) of polyester glycol to polyether glycol is about 80:20 to 20:80, preferably about 60:40 to 30:70.

The organic diisocyanate having the formula (I) according to this invention may include dicyclohexylmethane-4,4'-diisocyanate, 3,3'-dimethyldicyclohexylmethane-4,4'-diisocyanate, 4,4'-isopropylidenedicyclohexyl diisocyanate, 3,3'-dimethyl-4,4'-isopropylidenedicyclohexyl diisocyanate, etc.

The organic diamine having the formula (II) may include 4,4'-diaminodicyclohexylmethane, 3,3'-dimethyl-4,4'-diaminodicyclohexylmethane, 4,4'-isopropylidenedicyclohexyldiamine, 3,3'-dimethyl-4,4'-isopropylidenedicyclohexyldiamine, etc. The preferred organic diamines are 4,4'-diaminodicyclohexylmethane and 4,4'-dimethyl-4,4-diaminodicyclohexylmethane. The preferred combination of organic diisocyanate and organic diamine comprises dicyclohexylmethane-4,4'-diisocyanate with 4,4'-diaminodicyclohexylmethane, or dicyclohexylmethane-4,4'-diisocyanate with 3,3'-dimethyl-4,4'-diaminodicyclohexylmethane.

The amount of the organic diamine having the formula (II) in the chain extending reagent may be more than about 40 mol %, preferably more than about 50 mol %, more preferably more than about 55 mol %. If the polyurethane elastomer is made from a chain extending reagent having less than 40 mol % of said diamine, it has a lower melting point and less heat resistance. Accordingly, the resulting dyed composite sheet material becomes rough and inflexible.

The amount of ortho-, meta-, or para-phthalic acid dihydrazide having the formula (III) in the chain extending reagent may be in the range of about 5–60 mol %, preferably about 5–50 mol %, more preferably about 10–45 mol %. Meta-phthalic acid dihydrazide is preferred among the isomers of phthalic acid dihydrazide. When the amount of phthalic acid dihydrazide exceeds about 60 mol % of the total chain extending reagent, the composite sheet has an unfavorable surface with rough and entangled naps. It also has low heat resistance.

Mixtures of phthalic acid dihydrazide isomers may be employed in accordance with this invention.

An aliphatic diamine may also be used as one of the chain extending reagents, so long as it does not have an aromatic ring directly bonded to an amino group. Such aliphatic diamines may include hydrazine, hydrazine hydrate, various dicarboxylic acid dihydrazides, meta- or para-xylylene diamine or mixtures thereof, ethylene diamine, propylene diamine, etc. Xylylene diamine or a mixture of its isomers is preferred among these aliphatic diamines. Meta-xylylene diamine is most preferred.

When xylylene diamine is used as one of the components of the chain extender the preferred molar ratio of the organic diamine having the formula (II), phthalic acid dihydrazide having the formula (III) and xylylene diamine is 50–94.9:5–49.9:0.1–20, more preferably, 55–94:5–44:1–15. By incorporating xylylene diamine as one of the components of the chain extender, the composite material is much improved in crease resistance, supple hand characteristics, flexibility and surface smoothness. Using a molar ratio of chain extenders within the range described above is preferred.

Suitable solvents for the polyurethane elastomer of this invention may include N,N-dimethylacetamide, N,N-dimethylformamide, dimethyl sulfoxide, hexamethylphosphoramide, etc. Suitable metal salts which dissolve in the solvent described above may also be used to dissolve the polyurethane elastomer efficiently.

The following method may be employed to prepare the polyurethane elastomer of this invention. The polymeric diol is reacted with a molar excess of a suitable organic diisocyanate having the formula (I) in order to prepare the isocyanate terminated "prepolymer". The resulting prepolymer is dissolved in an organic solvent and is subsequently reacted with a mixture of chain extending reagents comprising about 0.35-0.7 mol equivalent, preferably about 0.45-0.7 mol equivalent of an organic diamine having the formula (II) and about 0.3-0.65 mol equivalent, preferably about 0.3-0.55 mol equivalent of phthalic acid dihydrazide having the formula (III). ("mol equivalent" relates to the mols of isocyanate groups contained in the prepolymer). The chain extending reaction of the prepolymer may be carried out in one step or by successively adding the organic diamine having the formula (II) and the phthalic acid dihydrazide having the formula (III), in separate steps.

A preferred fibrous sheet of this invention may consist of bundles of superfine denier fibers having a denier below 1.5, for example. More preferably, fiber bundles are provided containing at least 5 superfine denier fibers per bundle. A polyester fiber or a polyamide fiber, preferably a polyethyleneterephthalate fiber or a nylon-6 fiber of super fine denier (more preferably 0.05-0.5 denier) may be employed to obtain excellent and graceful naps. An excessively thick fiber makes the resulting sheet inferior and poor with respect to surface appearance and touch. On the other hand, an excessively fine fiber makes the sheet inferior with respect to abrasion or pilling resistance of the naps and also inferior in color because of excessive light reflection. Accordingly, a fiber having a controlled thickness as described above is preferred in the practice of this invention.

A multi-component fiber that forms a bundle of superfine denier fibers by elimination of at least one component of the multi-component fiber may be used in this invention. The bundle of superfine denier fibers which results from the use of special islands-in-a-sea fibers followed by eliminating the sea component is especially suitable. The special islands-in-a-sea fibers have a structure wherein one of the polymer elements is distributed as islands-in-a-sea of the other polymer element, viewed as a cross-section of the fiber, the number of islands being at least about 5 and respectively forming a fine filament portion which is continuous along the fiber axis, as described in British Pat. No. 1,171,843.

A multi-component fiber of a polymer blend type, in which the filament comprises a mixture of more than two mutually incompatible organic polymers, may be used in this invention. A superfine denier fiber useful in the practice of this invention may be obtained by spinning at least two different polymers which lie between each other when viewed in a cross-sectional view of the fiber, and wherein respective polymer components are mechanically peeled off.

A fibrous sheet of multi-component fibers of this invention may be produced by a process such as needle-punching, weaving or knitting and, if necessary, eliminating one of the component polymers by utilizing a solvent, or by peeling all or part of it off mechanically to produce fibers in bundles of superfine denier.

The following method is representative of the manufacture of a composite sheet material of this invention comprising superfine denier fibers as described above combined with the specific polyurethane elastomer of this invention. A web formed from multi-component fibers (such as islands-in-a-sea type staple) is intertwined by needle-punching or by other methods. Subsequently, the soluble component of the fiber is extracted with a solvent to yield a non-woven fabric made of superfine denier fibers, such as polyester (for example, polyethyleneterephthalate) or polyamide (for example, nylon-6). The resulting non-woven fabric is impregnated with a solution of the polyurethane elastomer of this invention, wet-coagulated and the solvent of the polyurethane elastomer is extracted with water. The product is dried and surface buffed to produce a napped sheet. The napped sheet is dyed by passing it through a venturi nozzle to treat it repeatedly with a dyeing fluid to give the sheet "a crumpled effect". Another suitable method comprises dissolving the soluble componet of the islands-in-a-sea fibers after completing the process of polyurethane impregnation and solvent extraction, then buffing and dyeing as described above.

A preferred method comprises impregnating a non-woven fabric sheet of islands-in-a-sea fibers with an aqueous solution of a water soluble polymer, such as polyvinylalcohol, starch or carboxymethylcellulose, dissolving the soluble component of said fibers, impregnating with a solution of polyurethane elastomer of this invention, wet-coagulating in water, extracting the solvent and the water soluble polymer in hot water, buffing and dyeing. Slicing and pressing steps may be used to adjust the thickness of the sheet at a suitable stage. Before the buffing process is performed, a specific silicone polymer may be applied to the sheet to obtain naps of suitable length and appearance.

The amount of polyurethane elastomer may be determined according to the quality or use of the composite sheet and is generally about 0.05-2% by weight of the fibrous sheet.

The composite sheet material of this invention, prepared by the method described above, has excellent crease resistance, ready processability for manufacturing a final apparel product and outstanding surface smoothness. It provides a graceful "writing effect" when finger marks are applied to its surface. The apparel products made from the composite sheet of this invention retain their appearance well on wearing for long periods of time and undergo little or no deformation as a result of cleaning. They suffer little or no partial deformation on wearing (such as seam puckers or protrusions at the knees or elbows). In addition to the foregoing, the composite sheet material of this invention has unique, elaborate hand characteristics and has a soft and supple touch. It does not discolor under the influence of nitrogen oxide gas or combustion exhaust gases or upon exposure to sunlight. As explained above, this invention has made it possible to manufacture a composite sheet material having excellent characteristics and qualities which have never been realized before. This is done by providing an elaborate combination of a specific polyurethane elastomer and a fibrous sheet material.

The provision of synthetic leather with a top coated layer is also included as a part of this invention. This may be realized by applying the coating of the polyurethane elastomer of this invention to a surface of fibrous sheet material.

This invention is further illustrated by the following examples in which a composite sheet material is evaluated by various measurements and parameters, the definitions of which are as follows:

"Flexibility" is defined as the force in grams which is required to bend, through a deflection of 2 mm, a sample which is 2 cm×5 cm in size, and which is restrained at spaced points 1 cm apart at a common level. The bending is accomplished by means of a pull rod which contacts the sample midway between the spaced points and the pull rod is preferably connected to a load cell to measure the required force. A sheet with considerable flexibility has a flexibility value of less than about 100 grams.

"Repulsive elasticity" is defined herein as an arc length measured after quadruply folding a sample having a size of 2 cm×10 cm, maintaining the folded sample under a load of 4 kg. for five minutes and forming an arc with a substance which weighs 25 g. and which is hung from fulcrums at a distance 50 cm apart, the arc being provided by the recovery force of the folded sample. For comparison purposes, a typical natural suede leather has an arc (a repulsive elasticity value) of 0.5–1.0 cm.

"Crease resistance" is measured by an SJK Crease-O-Meter manufactured by Showa Juki Co. Inc., of Japan, in accordance with J.I.S. (Japanese Industrial Standard) L1041-1960. A high value shows considerable crease resistance.

"Residual deformation" in a curved surface is measured by a dome-plasticity tester manufactured by San-ei Sokki Co., Inc. of Japan. According to J.I.S. K-6549-1970, the larger the value obtained, the more the residual deformation which is realized, for example, in a protrusion at the knee or elbow of a garment.

"Weathering change of surface appearance of napped sheet". In conducting this test, a sample is irradiated by a Sunshine-Weather Meter manufactured by Suga Testing Machine Co., Inc., of Japan, for 100 hours at 60°–70° C., and exposed to air containing 70% moisture. Discoloration is judged and graded in five degrees. Pilling is measured by a random pilling test and is judged in accordance with the standards of ASTM-D 1375-67. A large number shows small discoloration and considerable pilling resistance as well as abrasion-resistance on weathering.

"Smoothness of the surface on wearing for 1 month". Jumpers that are prepared from sample sheets are worn for a month, and during that period are washed in water 3 times. Smoothness and unevenness are judged, each in 5 degrees.

The following Examples are illustrative of the invention.

EXAMPLE 1

A non-woven web was made from islands-in-a-sea type staple fibers of 3.4 denier, 51 mm in length, 5 crimps/inch, and drawn at a draw ratio of 2.3. The web comprised 50 parts of an islands component comprising polyethyleneterephthalate and 50 parts of sea component containing 47 parts of polystyrene and 3 parts of polyethylene glycol, said island component being distributed as 16 islands in the sea component when viewed as a cross section of the fiber. The web was produced by carding and cross-rapping. Subsequent needle-punching of the web produced a non-woven fabric having a density of 0.170 g/cm$^3$. The non-woven fabric was immersed in a 20% aqueous solution by weight of polyvinylalcohol and was dried. Its sea component (polystyrene) was extracted with perchloroethylene. This produced a non-woven fabric of this invention comprising superfine denier fibers.

An isocyanate intermediate called "a prepolymer" was prepared by the reaction of 1 mol of a polymeric diol mixture comprising 50 parts of polycaprolactone glycol having a molecular weight of 1990 and 50 parts of polytetramethyleneoxide glycol having a molecular weight of 2020, and 2 mols of dicyclohexylmethane-4,4'-diisocyanate for 3 hours at 90° C., and was dissolved in N,N-dimethylformamide to give a solution of 50% by weight. N,N-dimethylformamide solution of 0.7 mol of 4,4'-diaminodicyclohexylmethane, 0.28 mol of meta-phthalic acid dihydrazide and 0.04 mol of butylamine was added to a 50% solution of the "prepolymer" to give a 14% solution of a polyurethane elastomer of this invention.

The non-woven fabric obtained by the method described above was immersed in the polyurethane elastomer solution, squeezed between rollers, coagulated with water for 1 hour, treated with hot water at 80° C. to extract the solvent and polyvinylalcohol, dried, sliced to a thickness of 1.1 mm and buffed to nap the sheet. The napped sheet, which had a thickness of 0.85 mm, was dyed in dyeing equipment referred to as "circular", manufactured by Hisaka Works Co. Ltd., of Japan, said sheet being passed repeatedly through a venturi nozzle for 1 hour at 125° C. together with an aqueous solution containing 2% o.w.f. of a disperse dye. A napped sheet having a density of 0.289 g/cm$^3$ was obtained by finish brushing the dyed sheet.

For comparison, a composite sheet material was obtained in the same manner as detailed above, except for substitution of a polyurethane elastomer of a 13% solution of N,N-dimethylformamide comprising a polymeric diol mixture of 50 parts of polycaprolactone glycol having a molecular weight of 1990 and 50 parts of polytetramethyleneoxide glycol having a molecular weight of 2020, diphenylmethane-4,4'-diisocyanate and 4,4'-diaminodiphenylmethane (Comparison 1).

The density of the composite sheet material of Comparison 1 was 0.230 g/cm$^3$.

The properties of the napped sheets of Example 1 and of Comparison 1 are shown in Table 1. The values in Table 1 explicitly show that the sheet of this invention, though having a dense and elaborate structure, has soft and supple hand characteristics. It is also shown that the sheet of this invention has excellent crease resistance and a dome plasticity which is about the same as those of the sheets of Comparison 1. It has good repulsive elasticity. As for the smoothness and appearance of the napped surface, the sheet of this invention keeps its excellent properties even after being sewn into a jumper and worn for 1 month. Furthermore, the sheet of this invention hardly discolors at all.

EXAMPLE 2

Composite sheet materials were obtained in the same manner as in Example 1, except for using polyurethane elastomer solutions whose constituents and concentrations are summarized in Table 2.

The properties of the napped sheets are also shown in Table 2. As is apparent from Table 2, the composite sheets of this invention have excellent hand characteristics, excellent flexibility, good crease resistance, small partial deformation which is indicative of minimal bagginess at the knee or elbows of garments even after wearing for a long time, and excellent surface smoothness even after having been worn for 1 month.

TABLE 1

| | Crease resistance (%) | Residual deformation (%) | Hand Characteristics | | Surface Smoothness of a sheet after being worn for 1 month (grade) | Change of napped sheet surface (grade) | |
| --- | --- | --- | --- | --- | --- | --- | --- |
| | | | Flexibility (g) | Repulsive Elasticity (cm) | | Blank | Exposure to Weather-o-meter for 100 hours |
| Example of this invention | 85 | 40 | 100 | 2.4 | 5 | 5 | 4–5 |
| Comparison 1 | 87 | 37 | 220 | 6.5 | 5 | 5 | 1 |

TABLE 2

| Examples | Polyurethane | | | | Concentration of Polyurethane Solution (%) | Properties of Dyed Sheet | | | | | | | | | |
|---|---|---|---|---|---|---|---|---|---|---|---|---|---|---|---|
| | Polymeric Diol (Parts) (MW) | Diisocyanate | Chain Extender (molar ratio) | | | Apparent Density (g/cm³) | Crease Resistance (%) | Residual Deformation (%) | Hand Characteristics | | Weathering change of napped Surface Irradiation time by Weather-o-meter | | | | Surface smoothness after being worn for 1 Month (Class) |
| | | | | | | | | | Flexibility (g) | Repulsive Elasticity (cm) | No Irradiation | 100 hours | | | |
| | | | | | | | | | | | | Pilling | Discoloring | | |
| 2-1 | PCL (70) (1990) | RMDI | RMBA (80) | MPH (20) | 15 | 0.298 | 83 | 41 | 95 | 2.3 | 5 | 5 | 5 | 5 | 5 |
| 2-2 | PBA (50) (2005) | RMDI | RMBA (60) | MPH (40) | 15 | 0.298 | 84 | 42 | 96 | 2.4 | 5 | 4 | 5 | 5 | 5 |
| 2-3 | PCL (50) (1990) | RMDI | RMBA 3,3'-dimethyl- (70) | MPH (30) | 16 | 0.312 | 85 | 39 | 100 | 2.5 | 5 | 4 | 5 | 5 | 5 |
| 2-4 | PCL (60) (1990) | IPCHI | RMBA (70) | MPH (30) | 16 | 0.305 | 85 | 40 | 99 | 2.5 | 5 | 5 | 5 | 5 | 4 |
| 2-5 | PTMG (100) (1750) | RMDI | RMBA (50) | MPH (50) | 15 | 0.299 | 87 | 40 | 182 | 4.6 | 5 | 4-5 | 5 | 5 | 5 |
| 2-6 | PCL (100) (2020) | RMDI | RMBA (65) | MPH (35) | 16 | 0.309 | 82 | 42 | 98 | 2.2 | 5 | 5 | 5 | 4 | 3 |
| 2-7 | PCL (50) (1990) | RMDI | RMBA (70) MPH (20) | MXDA (10) | 16 | 0.303 | 80 | 42 | 95 | 2.2 | 4 | 4 | 4 | 4 | 5 |
| Comparison 2 | PCL (70) (1990) | MDI | MBA (100) | | 16 | 0.294 | 87 | 38 | 220 | 6.5 | 5 | 1 | 1 | 1 | 5 |

PTMG: Polytetramethyleneoxide glycol
PCL: Polycaprolactone glycol
PBA: Polybutyleneadipate glycol
RMDI: Dicyclohexylmethane-4,4'-diisocyanate
IPCHI: 4,4'-isopropylidenedicyclohexyldiisocyanate
MDI: diphenylmethane-4,4'-diisocyanate
RMBA: 4,4'-diaminodicyclohexylmethane 3,3'-dimethyl-RMBA: 3,3'-dimethyl-4,4'-diaminodicyclohexylmethane
MBA: 4,4'-diaminodiphenyl-methane
MXDA: meta-xylylenediamine
MPH: meta-phthalic acid dihydrazide

What we claim is:

1. A composite sheet material comprising a fibrous sheet which is impregnated with a polyurethane elastomer, wherein said polyurethane elastomer comprises the reaction product of
   (A) a polymeric diol having a molecular weight of about 800–4000;
   (B) an organic diisocyanate having the formula (I):

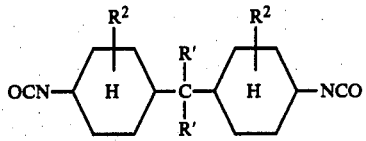

wherein R' and R$^2$ are hydrogen or an alkyl group having 1–5 carbon atoms, respectively, and
   (C) a chain extender comprising 40–95 mole % organic diamine having the formula (II):

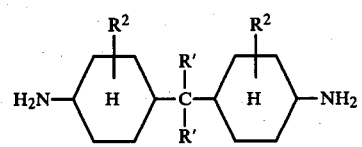

wherein R' and R$^2$ are hydrogen or an alkyl group having 1–5 carbon atoms, respectively, and 60–5 mole % phthalic acid dihydrazide having the formula (III):

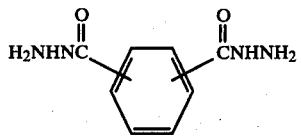

2. The composite sheet material of claim 1 wherein said fibrous sheet comprises a non-woven fabric.

3. The composite sheet material of claim 1 wherein said fibrous sheet comprises a woven fabric.

4. The composite sheet material of claim 1 wherein said fibrous sheet comprises a knitted fabric.

5. The composite sheet material of claim 1 wherein said composite sheet material has naps on at least one surface.

6. The composite sheet material of claim 1 wherein said fibers constituting the fibrous sheet material consist essentially of a polymer selected from the group consisting of polyester and polyamide.

7. The composite sheet material of claim 1 wherein said organic diisocyanate having the formula (I) is a compound selected from the group consisting of dicyclohexylmethane-4,4'-diisocyanate, 3,3'-dimethyldicyclohexylmethane-4,4'-diisocyanate, 4,4'-isopropylidenedicyclohexyldiisocyanate, 3,3'-dimethyl-4,4'-isopropylidenedicyclohexyldiisocyanate and mixtures thereof.

8. The composite sheet material of claim 1 wherein said organic diamine having the formula (II) is a compound selected from the group consisting of 4,4'-diaminodicyclohexylmethane, 3,3'-dimethyl-4,4'-diaminodicyclohexylmethane and mixtures thereof.

9. The composite sheet material of claim 1 wherein the range of mol % of said organic diamine having the formula (II) is about 55–90 and that of phthalic acid dihydrazide having the formula (III) is about 45–10, based upon the number of mols of the total chain extender.

10. The composite sheet material of claim 1 wherein said phthalic acid dihydrazide having the formula (III) is meta-phthalic acid dihydrazide.

11. The composite sheet material of claim 1 wherein said fibrous sheet is composed mainly of fiber bundles comprising superfine denier filaments having deniers of less than about 1.5.

12. The composite sheet material of claim 11 wherein said fiber bundles comprise at least about 5 of said superfine denier filaments per bundle.

13. The composite sheet of claim 1 wherein said polymeric diol is selected from the group consisting of polyester glycol and polyether glycol.

14. The composite sheet material of claim 13 wherein said polyester glycol is polycaprolactone glycol.

15. The composite sheet material of claim 13 wherein said polyether glycol is polytetramethyleneoxide glycol.

16. The composite sheet material of claim 1 wherein said polymeric diol is a mixture of polyester glycol and polyether glycol.

17. The composite sheet material of claim 16 wherein the range of the ratio (by weight) of polyester glycol to polyether glycol in the mixture of said polymeric diol is about 80/20–20/80.

18. The composite sheet material of claim 16 wherein the range of the ratio (by weight) of polyester glycol to polyether glycol in the mixture of said polymeric diol is 60/40–30/70.

19. The composite sheet material of claim 16 wherein said polyester glycol is polycaprolactone glycol and said polyether glycol is polytetramethylene glcyol.

20. The composite sheet material of claim 1 wherein said chain extender is composed of an organic diamine having the formula (II), phthalic acid dihydrazide having the formula (III), and xylylenediamine.

21. The composite sheet material of claim 20 wherein the range of mol % of the organic diamine having the formula (II) is about 50–94.9, that of phthalic acid dihydrazide having the formula (III) is about 5–49.9, and that of xylylenediamine is about 0.1–20, based on the number of mols of the total chain extender.

22. The composite sheet material of claim 20 wherein the range of mol % of the organic diamine having the formula (II) is about 55–94, that of phthalic acid dihydrazide having the formula (III) is about 5–44, and that of xylylenediamine is about 1–15, based on the number of mols of the total chain extender.

23. The composite sheet material of claim 20 wherein said xylylenediamine is meta-xylylenediamine.

UNITED STATES PATENT AND TRADEMARK OFFICE
CERTIFICATE OF CORRECTION

PATENT NO. : 4212916
DATED : July 15, 1980
INVENTOR(S) : Minoru Tanaka et al

It is certified that error appears in the above-identified patent and that said Letters Patent are hereby corrected as shown below:

Column 1, line 26, delete "each", insert --ease-- line 54, delete "it" in the second occurence, insert --its--

Column 2, lines 40-45, delete in toto and insert the following formula substituted therefore:

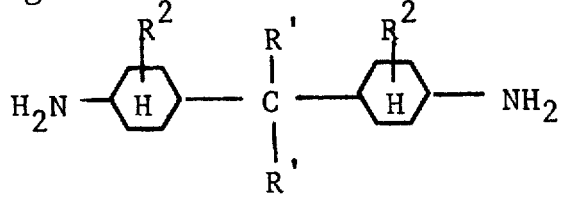

line 58, delete "immpart" and insert --impart--

Signed and Sealed this

Ninth Day of December 1980

[SEAL]

Attest:

SIDNEY A. DIAMOND

Attesting Officer

Commissioner of Patents and Trademarks